UNITED STATES PATENT OFFICE 2,248,074

TRISAZO DYESTUFFS

Eugen Glietenberg, Leverkusen-I. G.-Werk, and Josef Hilger and Willi Hartmann, Leverkusen-Wiesdorf, Germany, assignors to General Aniline & Film Corporation, a corporation of Delaware No Drawing. Application April 22, 1939, Serial No. 269,410. In Germany May 2, 1938

4 Claims. (Cl. 260—171)

The present invention relates to new valuable trisazodyestuffs and to a method of preparing the same; more particularly it relates to trisazodyestuffs of the general formula

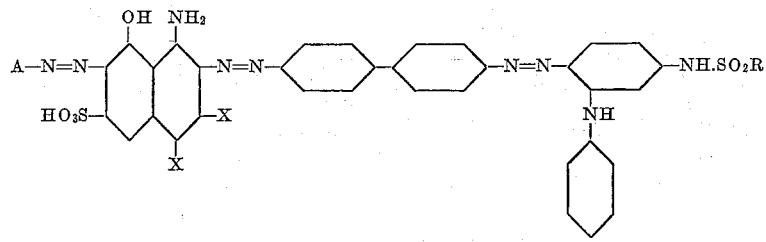

wherein A—N=N— stands for the radical of a monodiazo compound of the benzene series, R stands for alkyl, aryl or aralkyl, one X stands for hydrogen and the other X for —SO$_3$H, and the nuclei of the aminodiphenylamine derivative may be substituted by alkyl, halogen and so on.

Our new trisazodyestuffs are obtainable by first coupling in acid medium one molecular proportion of a 4.4'-tetrazodiphenyl with one molecular proportion of 1.8-aminohydroxynaphthalene-3.6- or 4.6-disulfonic acid, then combining in alkaline medium the diazoazo compound obtained with one molecular proportion of a monodiazo compound and thereupon with a derivative of 3-amino-diphenylamine in which one hydrogen atom of the amino group is replaced by an alkylsulfo-, arylsulfo or aralkylsulfo radical; the derivatives of 3-amino-diphenylamine may be further substituted in the nuclei by alkyl, halogen and so on.

The new dyestuffs go from neutral or weakly alkaline bath in black shades on cellulosic fibres and dye leather black bloomy shades. The dyestuffs are distinguished by a good fastness to acids and in general by the property to dye mixed fabrics consisting of various fibres such as cotton, wool, cellulosic wool, silk, artificial silk uniform and level shades. Compared with the dyestuffs of U. S. Patent 2,012,387 the new dyestuffs show the advantage of an improved fastness to water.

The following examples illustrate our invention without, however, restricting it thereto, the parts being by weight.

Example 1

184 parts of 4.4'-diaminodiphenyl are tetrazotized in the usual manner and coupled with 341 parts of 1-amino-8-hydroxynaphthalene-3.6-disulfonic acid in mineral acid medium. This intermediate is combined with a diazo compound prepared from 209 parts of sulfanilic acid (2H$_2$O), in a solution alkaline with sodium carbonate. If free diazo compound can no longer be detected a solution of 262 parts of 3-methyl-sulfamino-diphenylamine alkaline with sodium hydroxide is added. After several hours the dyestuff-formation is completed. By adding sodium chloride and neutralizing with mineral acid the dyestuff is separated. It corresponds in its free state to the following formula:

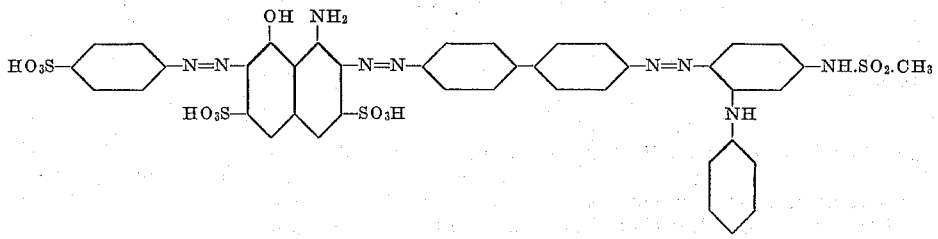

and dyes leather full bloomy black shades of excellent stability to acids.

If instead of 1-amino-8-hydroxynaphthalene-3.6-disulfonic acid the 1-amino-8-hydroxynaphthalene-4.6-disulfonic acid or a mixture of these two acids is used dyestuffs of similar properties but somewhat bluer shades are obtained.

Example 2

184 parts of 4.4'-diaminodiphenyl are tetrazotized in the usual manner and coupled with 341 parts of 1-amino-8-hydroxynaphthalene-3.6-disulfonic acid in mineral acid medium. This intermediate is combined with a diazobenzene solution prepared from 93 parts of aniline, in sodium carbonate alkaline medium. If free diazo compound can no longer be detected a solution of 324 parts of 3-benzene-sulfaminodiphenylamine alkaline with sodium hydroxide is added. After a short time the coupling is completed. The dyestuff is separated in the usual manner. It corresponds in its free state to the following formula:

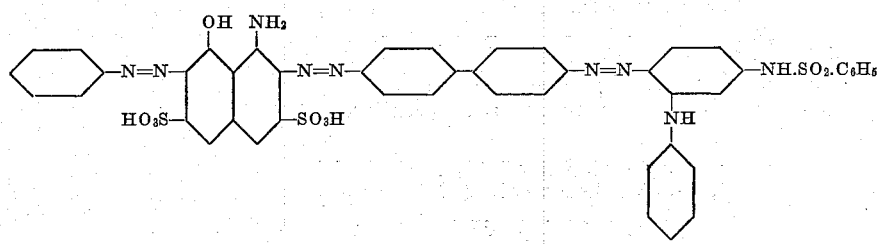

and dyes cotton from neutral or sodium carbonate alkaline bath green black shades of good fastness to water. It possesses the remarkable property to dye mixed fabrics of various fibres uniform shades.

If instead of 3-benzenesulfaminodiphenylamine substitution products thereof are used such as 3-(3'-chlorobenzenesulfamino)-diphenylamine very similar dyestuffs are obtained.

*Example 3*

If in Example 2 the 3-benzenesulfaminodiphenylamine is replaced by 3-methylsulfaminodiphenylamine a dyestuff is obtained which shows a somewhat increased solubility. If instead of the 3-methylsulfaminodiphenylamine the 3-benzylsulfaminodiphenylamine is employed a dyestuff of similar shade and similar properties is obtained.

*Example 4*

If in Example 2 the benzenesulfaminodiphenylamine is replaced by 3-methylsulfamino-2'-methyl-1.1'-diphenylamine a dyestuff of similar properties is obtained.

We claim:

1. As new products trisazodyestuffs of the general formula

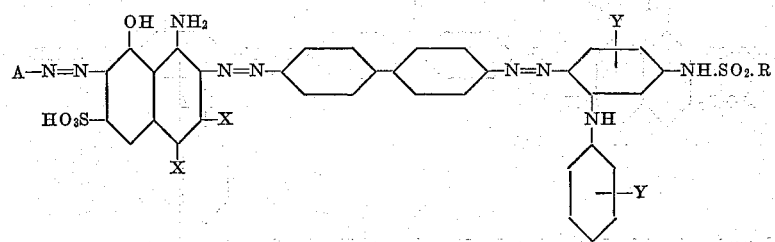

wherein A—N=N— stands for the radical of a monodiazo compound of the benzene series, R stands for a member selected from the group consisting of alkyl, aryl and aralkyl, one X stands for hydrogen, the other X stands for —SO₃H, and Y stands for one of the group consisting of hydrogen, halogen and alkyl.

2. As new products trisazodyestuffs of the general formula

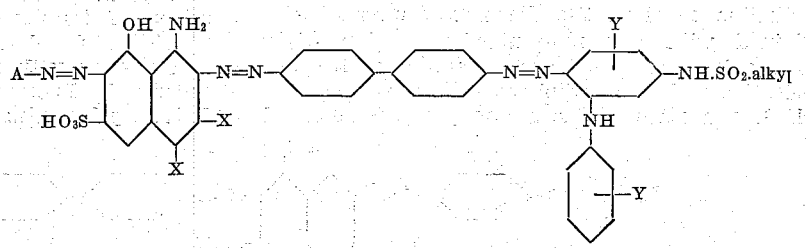

wherein A—N=N— stands for the radical of a monodiazo compound of the benzene series, one X stands for hydrogen, the other X stands for —SO₃H, and Y stands for one of the group consisting of hydrogen, halogen and alkyl.

3. As new product the trisazodyestuff corresponding in its free state to the following formula

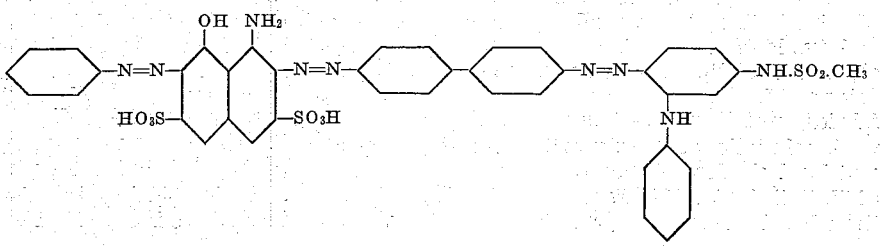

dyeing cotton from neutral bath or bath alkaline with sodium carbonate greenish black shades of good fastness to water.
4. As new product the trisazodyestuff corresponding in its free state to the following formula
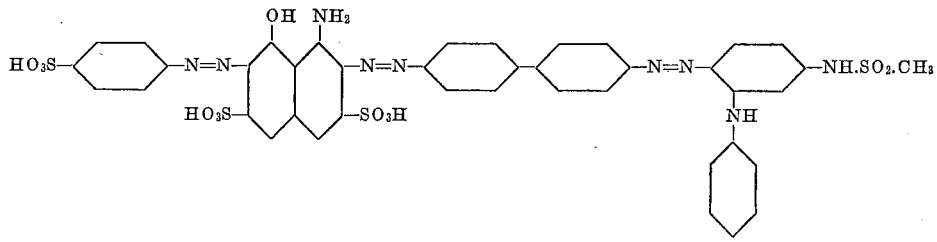
dyeing leather full bloomy black shades of excellent fastness to acid.
EUGEN GLIETENBERG.
JOSEF HILGER.
WILLI HARTMANN.